United States Patent [19]
van Prooijen et al.

[11] Patent Number: 5,358,005
[45] Date of Patent: Oct. 25, 1994

[54] SOLENOID VALVE WITH DIRT TRAP

[75] Inventors: Frank van Prooijen, Emmen; Wim Munsterhuis, Dalen, both of Netherlands

[73] Assignee: Honeywell Inc., Minneapolis, Minn.

[21] Appl. No.: 145,010

[22] Filed: Oct. 28, 1993

[30] Foreign Application Priority Data

Feb. 26, 1993 [DE] Fed. Rep. of Germany ....... 4305987

[51] Int. Cl.$^5$ ..................... F16K 31/06; F16K 51/00
[52] U.S. Cl. .................... 137/546; 137/244; 251/129.02; 251/129.19
[58] Field of Search ............... 137/244, 546; 251/129.15, 129.02, 129.19

[56] References Cited

U.S. PATENT DOCUMENTS

| | | | |
|---|---|---|---|
| 792,757 | 6/1905 | Cloos | 137/546 X |
| 4,563,133 | 1/1986 | Yasuhara | 137/244 X |
| 4,947,890 | 8/1990 | Sumida et al. | |

FOREIGN PATENT DOCUMENTS 3135261 3/1983 Fed. Rep. of Germany .

Primary Examiner—Arnold Rosenthal
Attorney, Agent, or Firm—Charles L. Rubow

[57] ABSTRACT

A solenoid valve in which an actuator is located above a valve seat and closure member. A valve stem which carries the closure member has a particle diverting collar thereon located above a valve stem guide in the valve housing. The valve housing has an annular, upwardly opening well therein encircling the valve stem below the collar, the well functioning as a particle collector.

8 Claims, 2 Drawing Sheets

SOLENOID VALVE WITH DIRT TRAP

BACKGROUND OF THE INVENTION

The invention relates generally to valve features for avoiding contamination of operating valve parts from internally produced particles, and more specifically to a solenoid valve design in which a vertically movable stem carrying a valve closure member and a guide structure in which the stem moves are specifically configured to prevent particulate matter from entering the bearing clearance between the stem and guide structure.

Particulate contamination of solenoid operated valves is a well recognized problem. Particulate matter in fluid medium surrounding the valve seat and closure member may be deposited on the seat and/or closure member, where it tends to impair closure and/or sealing of the valve. In addition, particles may become lodged in the clearance space between the valve stem and guide structure, where they may interfere with or preclude free movement of the stem and closure of the valve.

A filter and/or sediment trap in the form of a drip leg or a labyrinth or baffle structure is frequently provided at the supply side of a gas valve to catch particles entrained in the supply gas. However, such an arrangement does not protect against particles produced within the valve. Specifically, wear particles from the movable parts of the solenoid operator may be unavoidable even though the parts are carefully machined or formed. The wear particles occur as one part slides over or strikes against another part, and, understandably, are more prevalent in frequently actuated solenoid valves.

The previously described problem is particularly significant in valves of a design having a solenoid with a vertically movable armature above a valve closure member carried on a vertically movable stem. In such a design, gravity, sometimes assisted by pressure changes within the operator which occur upon actuation thereof, tends to move the particles toward the closure member and valve seat.

A variety of approaches have been conceived for eliminating or minimizing the migration of wear particles or other particulate matter from a solenoid operator into the vicinity of the valve seat/closure member. For example, German Patent Document DE 31 35 261 A1 discloses a solenoid valve in which the region of the valve through which the controlled fluid is intended to flow is sealed from the solenoid operator components by means of a metal bellows.

Another approach is shown in U.S. Pat. No. 4,947,890 which discloses a solenoid valve having an armature horizontally guided in a sleeve with radial fluid flow ports therein. Radial flow at the end of the armature tends to divert any particulate matter away from the annular clearance space between the armature and the sleeve. In certain of the disclosed embodiments, the sleeve is formed with a step increase in internal diameter or the armature is formed with step decrease in external diameter to accommodate foreign matter which may be deposited. In yet another disclosed embodiment, baffles are incorporated into the fluid flow passageway, the baffles tending to collect particles which may be present in the fluid whose flow is being controlled.

Although the above described and other valve designs have been devised for avoiding problems caused by foreign matter entering the flow passageway of a valve from the valve actuator, there is a continuing need for simpler design features which address the problems in an effective manner.

SUMMARY OF THE INVENTION

The invention is a valve of the type in which a valve closure member is carried on a valve stem for vertical movement in a guide opening in the valve housing, the stem and the housing in the vicinity of the guide opening being configured to divert and trap particulate matter originating above the stem to prevent it from entering and passing through the clearance space between the stem and guide structure. Diversion is accomplished by a collar on the stem above the valve guide. Particles are trapped in an annular upwardly opening well in the housing encircling the valve guide below the collar, the well having an inner generally vertical wall surface whose diameter is smaller than the outer diameter of the collar.

The inner wall surface of the annular well may be somewhat conical, with the smaller diameter being at the opening of the well. The valve operator may be a solenoid actuator having a plunger which is movable coaxially with the stem between an upper extreme position and a lower extreme position in which a plunger abuts the upper end of the stem. In a valve employing such an actuator, a spring between the housing and the stem biases the stem toward its upper position. The actuator plunger may be biased downwardly to abut the stem, and the spring between the housing and the stem may be a compression coil spring between the bottom wall surface of the well and the collar.

It is a principal object of the invention to avoid or minimize problems caused by wear particles produced by an actuator in a solenoid valve.

It is a further object to provide a solenoid operated gas valve which is not sensitive to wear particles produced by parts of the actuator which slide with respect to or strike against one another.

It is a yet further object to prevent wear particles produced by the actuator in a valve having a vertically movable stem from being deposited on the valve seat and/or closure member thereof.

Accordingly, the applicants have provided a valve of simple design which effectively prevents contaminants produced in the valve actuator from entering the fluid whose flow is being controlled.

DESCRIPTION OF THE PREFERRED EMBODIMENT

Figure 1:
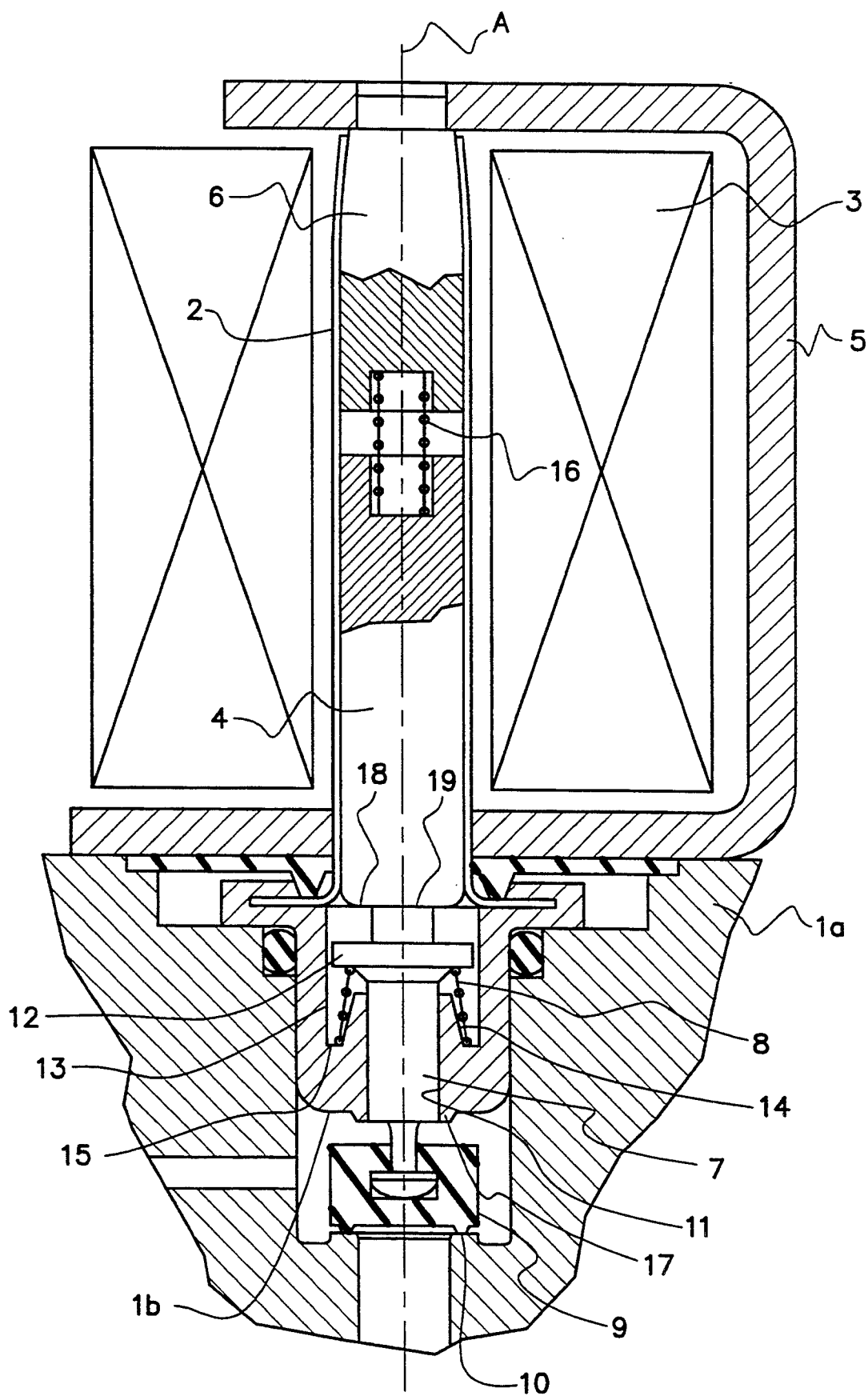
FIG. 1 is a partial sectional view of a solenoid valve incorporating a dirt trap in accordance with the applicants' invention, the valve being in its unactuated state.
Figure 2:
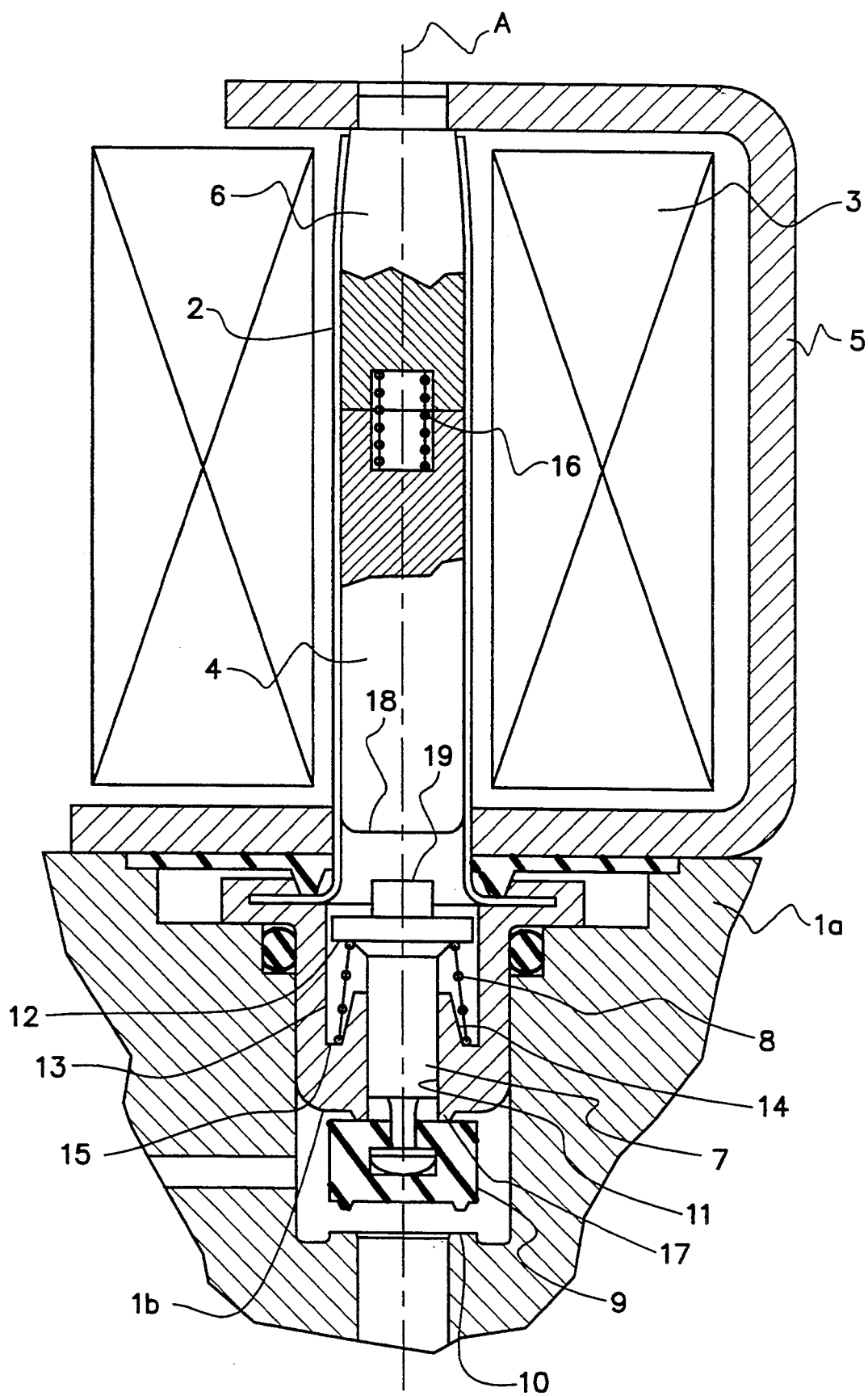
FIG. 2 is a partial sectional view of the solenoid valve shown in FIG. 1 with the valve in its actuated state.

In the Figures, reference numerals 1a and 1b identify principal members of housing means for a solenoid valve. A cylindrical sleeve 2 centered on and extending along an axis A is fixed to housing member 1b. When the valve is in its normal operating position, axis A is substantially vertical, and sleeve 2 extends upwardly from housing member 1b.

A solenoid coil 3 is shown surrounding sleeve 2. Within sleeve 2, and guided thereby for movement along axis A, is an armature or plunger 4. A yoke 5 of magnetic material brackets sleeve 2, and a core 6 of magnetic material extends from one end of yoke 5 into the upper end of sleeve 2. Yoke 5 and core 6 provide a low reluctance magnetic circuit for the field generated by coil 3. Core 6 also functions as an abutment for limiting upward movement of armature 4, and may also be provided with means for adjusting the stroke of the armature.

The lower end of armature 4 acts upon the upper end of a valve stem 7 which is also movable relative to housing member 1b along axis A. Valve stem 7 is biased upwardly by means of a spring 8. The lower end of stem 7 carries a valve closure member 9 which cooperates with a valve seat 10 formed in housing member 1a in a fluid flow passageway within the housing to control flow between fluid inlet and outlet ports also in the housing.

Valve stem 7 is confined to movement along axis A by a valve guide opening 11 through housing member 1b. For the valve design shown in the Figures, valve guide opening 11 is above valve closure member 9 and valve seat 10.

Valve stem 7 is provided with a collar 12 which encircles the stem above valve guide opening 11. Collar 12 has an external diameter substantially greater than the internal diameter of valve guide opening 11, and shields the clearance space between the stem and internal surface of the valve guide opening.

The upper surface of housing member 1b beneath collar 11 is formed with an annular, upwardly opening groove or well 13 which encircles valve stem 7. Collar 12 functions to deflect particulate matter originating above stem 7 away from the clearance space between the stem and the internal surface of valve guide opening 11. Any such particulate matter entering the clearance space could increase friction between stem 7 and housing member 1b, thereby impairing movement of the stem. In addition, such particulate matter could pass through the clearance space into the fluid whose flow is being controlled, and be deposited on valve closure member 9 or valve seat 10, thereby interfering with proper closure of the valve.

Particulate matter originating above stem 7 is deflected by collar 12 into well 13 which is, in part, bounded by generally vertical inner and outer walls. Inner wall surface 14 is shown somewhat conical, having a smaller diameter at its top than at its bottom. The bottom edge of inner wall surface 14 intersects a bottom wall surface 15 which connects the inner and outer walls. Spring 8 which upwardly biases stem 7 is shown as a conical compression spring positioned between bottom wall surface 15 and the underside of collar 12.

The solenoid valve shown in the Figures is of a type in which armature 4 is a separate element from valve stem 7, the lower end of the armature abutting the upper end of the stem when the solenoid is not energized. A compression coil spring 16 which biases armature 4 in a downward direction is shown between the armature and core 6. The force provided by spring 16 is greater than that provided by spring 8, thereby maintaining closure member 9 against valve seat 10 when the solenoid is not energized. When electric current is supplied to coil 3 magnetic force is applied to armature 4 which overcomes the force of spring 16, and permits spring 8 to lift closure member 9 from valve seat 10 to open the valve. In this position, closure member 9 may contact a second valve seat identified by reference numeral 17 to terminate flow through a second fluid flow passageway (not shown) in valve housing means 1a, 1b.

The present invention is particularly advantageous in valves of the illustrated type in which wear particles are produced as a result of end surface 18 of armature 4 striking end surface 19 of stem 7 when the solenoid actuator is deenergized. Thus, the applicants have provided a simple, low-cost approach to minimizing sensitivity of a solenoid valve having a vertically stacked valve stem and actuator plunger to particulate contaminants originating above the stem.

Although a specific embodiment has been shown and described for illustrative purposes, a number of variations and modifications will be apparent to those of ordinary skill in the relevant arts. It is not intended that coverage be limited to the embodiment shown, but only by the terms of the following claims.

The embodiments of the invention in which an exclusive property or right is claimed are defined as follows:

1. A solenoid valve of the type including a valve stem movable by a solenoid armature along an axis which is vertically oriented when the valve is in its normal operating position, the valve stem carrying a closure member and moving within valve guide structure surrounding the stem between the armature and the closure member, wherein the improvement comprises:

a collar on the valve stem at a location between the valve guide and the armature, the external diameter of said collar being larger than the internal diameter of the valve guide; and an annular well in the valve guide structure, said annular well encircling the valve stem and opening toward said collar, the diameter of the inner lip of said annular well being smaller than the external diameter of said collar.

2. The solenoid valve of claim 1 wherein said annular well is configured with an inner wall surface which, from the opening of said well to the bottom thereof, is inclined away from the valve stem.

3. The solenoid valve of claim 1 wherein a coil spring is provided between said collar and the bottom of said well.

4. The solenoid valve of claim 2 wherein a coil spring is provided between said collar and the bottom of said well.

5. A valve comprising:

housing means defining a valve seat in a flow passageway between fluid inlet and outlet ports, the valve seat lying in a plane transverse to an axis which is vertically oriented when the valve in its normal operating position, said housing means further defining a cylindrical guide opening which intersects the flow passageway and extends along the axis above the valve seat;

a valve stem carried in the guide opening in said housing means for movement along the axis;

a valve closure member mounted on said valve stem below the guide opening, said valve closure member being movable with said valve stem toward and away from the valve seat;

an actuator which interfaces with said valve stem above the guide opening in said housing means for moving said valve stem along the axis;

a collar carried on and encircling said valve stem above the guide opening in said housing means, said collar having a predetermined outer diameter; and an annular well in said housing means encircling the upper end of the guide opening, said annular well being bounded by inner and outer generally vertical wall surfaces joined by a bottom wall surface and having an open upper end facing said collar, the diameter of the inner wall surface being smaller than the outer diameter of said collar.

6. The valve of claim 5 wherein:

said actuator includes a plunger movable along the axis between an upper extreme position and a lower extreme position in which it abuts the upper end of said valve stem; and a spring element is provided between said housing means and said valve stem for biasing said valve stem in an upward direction.

7. The valve of claim 6 wherein the inner wall surface of said annular well is a conical surface having a smaller diameter at the open end of said well than at the bottom wall surface thereof.

8. The valve of claim 7 wherein said spring element is a coil spring encircling said valve stem and mounted in compression between said collar and the bottom wall surface of said annular well.

* * * * *